United States Patent [19]

Pletcher

[11] Patent Number: 5,822,963
[45] Date of Patent: Oct. 20, 1998

[54] PROCESS FOR HARVESTING FRESHLY CUT HAY

[76] Inventor: Harvey A. Pletcher, 2414 Harvard, Perryton, Tex. 79070

[21] Appl. No.: 835,182

[22] Filed: Apr. 4, 1997

[51] Int. Cl.$^6$ .................................................. A01D 39/00
[52] U.S. Cl. ............................... 56/16.4 R; 56/1; 56/341
[58] Field of Search ........................... 56/1, 16.4 R, 192, 56/341, 16.4; 100/88, 89; 426/636, 73; 241/56, 57, 101.7, 167

[56] References Cited

U.S. PATENT DOCUMENTS

| 4,026,528 | 5/1977 | Kline et al. ................................... 259/7 |
| 4,092,004 | 5/1978 | Leverenz et al. ............................ 241/56 |
| 4,092,014 | 5/1978 | Hughes ...................................... 366/156 |
| 4,205,514 | 6/1980 | Wolrab ......................................... 56/341 |
| 4,311,282 | 1/1982 | Howell ........................................ 241/56 |
| 4,327,537 | 5/1982 | Wolrab ............................................ 56/1 |
| 4,432,499 | 2/1984 | Henkensiefken ........................... 241/30 |
| 4,556,505 | 12/1985 | Fenn .......................................... 252/194 |
| 4,561,781 | 12/1985 | Seymour ................................... 366/132 |
| 4,561,995 | 12/1985 | Fenn .......................................... 252/194 |
| 4,577,805 | 3/1986 | Seymour ............................. 241/101 B |
| 4,743,454 | 5/1988 | Tomes .......................................... 426/61 |
| 4,896,970 | 1/1990 | Schuler .................................... 366/296 |
| 4,980,184 | 12/1990 | Dahlgren et al. ......................... 426/335 |
| 5,143,310 | 9/1992 | Neier .................................... 241/101.8 |

Primary Examiner—Michael J. Carone
Assistant Examiner—Robert Pezzuto
Attorney, Agent, or Firm—Norman B. Rainer

[57] ABSTRACT

A process for harvesting freshly cut undried hay involves adding to the hay disposed in windrows a comminuted dry comestible additive substance, thereby forming a preliminary mixture. The amount of additive substance employed is such as to cause the overall moisture content of the preliminary mixture to be below 20%. The mixture is then mixed to produce a forage composition which is then baled.

1 Claim, 1 Drawing Sheet

PROCESS FOR HARVESTING FRESHLY CUT HAY

BACKGROUND OF THE INVENTION

1. Field of the Invention

This invention relates to the production of comestible material for livestock, and more particularly concerns a process for utilizing freshly cut hay in the production of such comestible material.

2. Description of the Prior Art

Hay may generally be defined as a horse and cattle feed made up of the dried stems and leaves of plants. Hay may be made from cultivated grasses such as timothy, bluegrass, and redtop. Or it may be made from some of the wild, or prairie, grasses. Alfalfa, clover, velvet beans, rye, barley, and oats are also used for hay. The use of this dried-plant food dates almost as far back in man's history as the taming of the horse.

After the farmer cuts the hay, he allows it to lie on the ground to dry. It is then raked into long rows, called windrows, and allowed to dry still further in the sun and air. When the hay is dry, the farmer either bales or chops it. He may use an automatic baling machine that ties the bales with string or wire. The bales may be of cube or round configuration and may weigh from 50 pounds to several hundred pounds. Some baling machines drop the bales on the ground to be picked up later. Others load the bales directly on a wagon that trails behind the baler. Farmers prefer the latter method because it saves time and requires less labor. The bales are stored in barns or stacked outdoors and covered with loose hay or canvas.

If a farmer chooses to chop his hay before storing it, he uses a forage harvester. This machine cuts the hay into short pieces and blows it onto a wagon or truck. The wagon or truck has high sides and ends that hold the chopped hay in place as it comes from the blower. The farmer then hauls the hay to the barn. Conveyers move the hay from the wagon into another blower, which blows it into the haymow.

Many farmers use artificial means for curing hay to speed up the harvest and to decrease the hazard of getting the hay wet with rain. After cutting the hay, the farmer allows it to lie in the field until it is about half dry. Then he harvests it and hauls it to an artificial drier, which may be in the barn or in a special structure. After the hay has been properly placed in the drier, large propeller-type fans blow air through the hay. This process continues until the moisture in the hay has been reduced to about 20 per cent. Hay that contains too much moisture will spoil. Hay will sweat (heat) after it is stored in the barn. Sometimes it creates so much heat that it sets itself on fire. For this reason, farmers take great care to dry their hay adequately before they store it.

Some farmers who produce high-quality hay speed up the artificial drying process by using heat. This increases the curing cost, but it produces hay of better quality.

The hay is often blended with other comestible farm substances or by-products to produce a livestock feed composition sometimes referred to as "forage." A machine for chopping hay and homogenizing the comminuted hay is disclosed in U.S. Pat. No. 5,143,310 and is adapted to operate on an infeed of baled hay. Other representative grinder/mixer machines for use with agriculture materials to produce forage products are disclosed in U.S. Pat. No. 2,800,238 to Oliver; U.S. Pat. No. 3,997,146 to Kline; U.S. Pat. No. 4,026,528 to Kline et. al.; U.S. Pat. No. 4,311,282 to Howell; U.S. Pat. No. 4,432,499 to Henkensiefken; and U.S. Pat. No. 4,561,781 and U.S. Pat. No. 4,577,805 to Seymour. In general, such machines are truck-mounted to facilitate pick-up of crop materials and transport of the feed mixture to the place of feeding or storage.

U.S. Pat. No. 4,092,004 to Leverenz et. al. concerns a trailered comminuting and mixing apparatus which includes a supplemental hopper for adding augmenting ingredients to the comminuted crop material.

None of the aforesaid prior patents address the issue of handling undried crop material, particularly in unbaled form. The curing or drying process conventionally applied to freshly cut crop material is expensive if conducted off-site, and interferes with subsequent harvests if conducted on-site in the field.

It is a primary object of the present invention to provide a process for converting freshly cut crop material directly into storage-stable forage.

It is a further object of the present invention to provide a process of the aforesaid nature which operates on unbaled freshly cut crop material disposed in windrows.

These objects and other objects and advantages of the invention will be apparent from the following description.

SUMMARY OF THE INVENTION

The above and other beneficial objects and advantages are accomplished in accordance with the present invention by a process for converting freshly cut, undried crop material directly into storage-stable forage comprising:

a) gathering said freshly cut crop material into windrows, b) adding to said material in said windrows a dry comestible additive substance in comminuted form to produce a preliminary mixture, the amount of said additive substance being sufficient to cause said preliminary mixture to have a moisture content below 20%, c) lifting said preliminary mixture off the ground and subjecting it to a mixing operation to produce a forage composition, and d) baling said forage composition.

Apparatus useful in carrying out the process of the present invention comprises a wheeled chassis which supports:

a) storage means for confining a dry comestible additive substance, b) comminuting means disposed below said storage means and which receive said additive substance by gravity flow, and c) means for controllably dispensing the comminuted additive substance downwardly upon a windrow of undried crop material.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
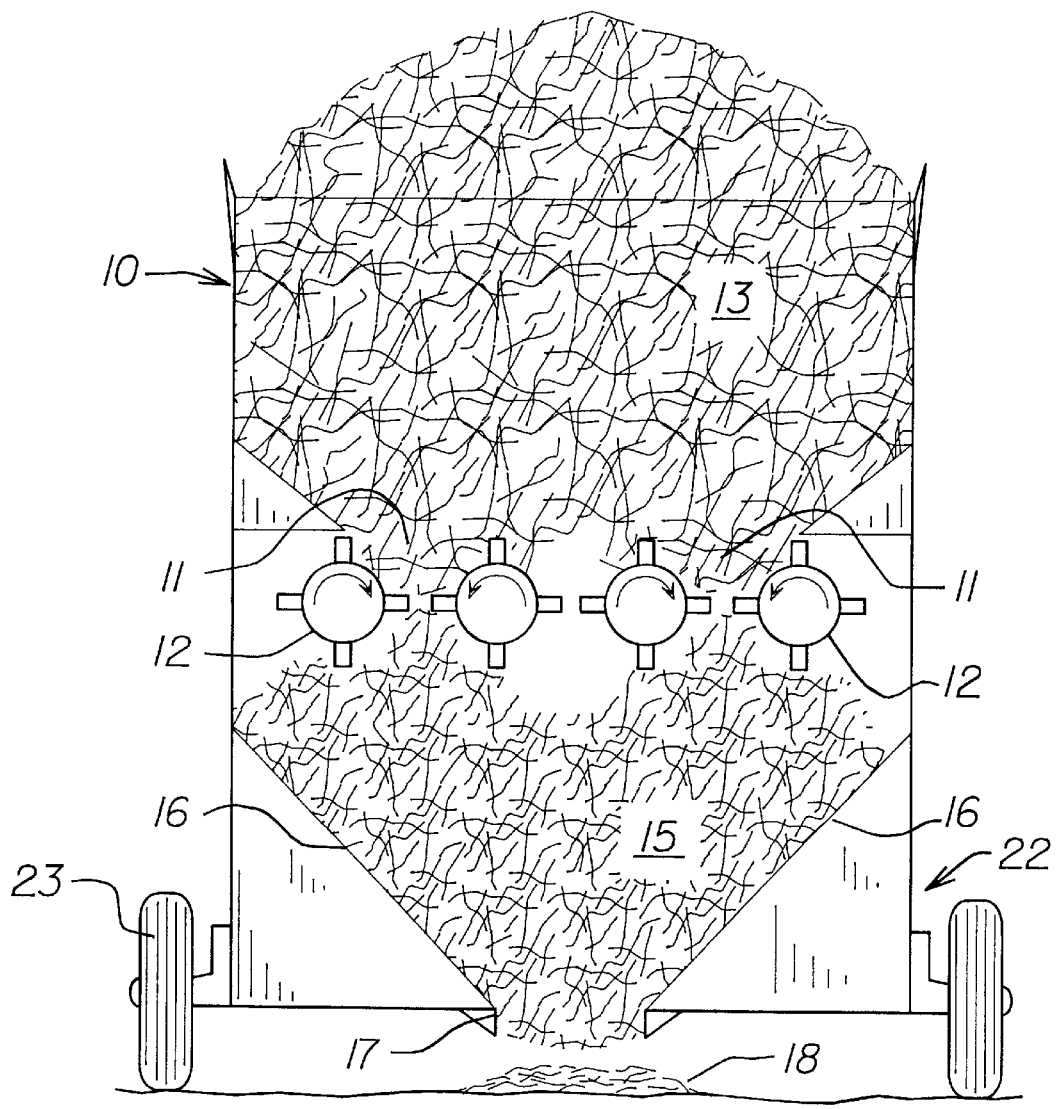
FIG. 1 is a schematic sectional rear view of an embodiment of apparatus useful in the process of the present invention.

In the method of the present invention, freshly cut crop material is produced employing apparatus generally referred to as a "swather." The cut crop material output of the swather can either be laid upon the ground in windrows, or can be fed directly into subsequent processing apparatus. The process of the present invention is intended for the treatment and handling of cut crop material lying in windrows in the growing field.

A dry comestible additive substance in comminuted form is added to said cut crop material prior to the lifting and baling thereof.

Suitable comestible additive substances include, for example: corn cobs, peanut shells, grains, straw, soybeans, clover, alfalfa, sorghum silage, and grasses. The comestible substance should have a pre-dried moisture content below 12%. The average particle size of the comminuted additive substance should be in the range of 1/8" to 2". When the size of the additive is too small, the additive will not be uniformly retained by the crop material. When the size of the additive is too large, it will not readily blend with the crop material. The amount of additive substance added to the crop material is such as to produce a moisture content below 20% in the intermediate mixture. For example, if the freshly cut crop material contains 25% moisture, and the additive substance contains 12% moisture, then 62.5 pounds of additive substance should be added to every 100 pounds of freshly cut crop material. If the same additive substance contains only 8% moisture, then only 41.6 pounds are required per 100 pounds of the same crop material.

The preliminary mixture, formed when the comminuted additive is dropped onto the hay lying in a windrow, is homogenized in a baling operation which then presses the mixture and ties it into bales which are either re-deposited upon the ground or transferred to an accompanying truck.

Referring now to FIG. 1, an embodiment of apparatus useful in the process of the present invention is shown consisting of storage hopper 10 which confines additive substance 13, and paired downwardly directed conduits 11 which receive said additive substance from said hopper by gravity flow. Two pairs of counter-rotating cutting wheels 12 are interposed within conduits 11 for the purpose of comminuting the descending additive substance. The lowermost extremities of said conduits communicate with receiving chamber 15 having downwardly sloped walls 16. Means in the form of valved aperture 17 for controllably dispensing comminuted substance is positioned at the lowermost extremity of chamber 15. Comminuted additive substance downwardly emergent from aperture 17 falls directly upon hay in windrows 18. The entire apparatus may be mounted upon a trailer chassis 22 having wheels 23, or may be mounted directly on a hay baler.

The process of the present invention affords several advantages:

a) it enables useful disposal of comestible additive substances, b) it permits faster turn-around of freshly cut crops in the farmer's field, c) it saves the time and energy otherwise required to produce storage-stable bales of forage, and d) it preserves the nutritional value of the freshly cut crop material because it avoids the deleterious effects of air oxidation, degradation by exposure to sunlight, microbial decay, and insect effects during prolonged outdoor exposure for drying purposes.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

What is claimed is:

1. A process for converting freshly cut, undried crop material directly into storage-stable forage comprising:

a) gathering said freshly cut crop material having a moisture content greater than 20% into windrows upon the ground in the field where said crop material was grown, b) adding to said material in said windrows a dry comestible additive substance in comminuted form having an average particle size between 1/8 and 2 inches, thereby producing a preliminary mixture, the amount of said additive substance being sufficient to cause said preliminary mixture to have a moisture content below 20%, c) lifting said preliminary mixture off the ground and subjecting it to a mixing operation to produce a forage composition, and d) baling said forage composition.

* * * * *